(12) United States Patent
Chen et al.

(10) Patent No.: US 9,052,871 B2
(45) Date of Patent: Jun. 9, 2015

(54) RECESS FOR MEMORY CARD

(75) Inventors: Chun-Pu Chen, Taipei (TW); Ning Chang, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 200 days.

(21) Appl. No.: 13/527,753

(22) Filed: Jun. 20, 2012

(65) Prior Publication Data

US 2013/0344720 A1 Dec. 26, 2013

(51) Int. Cl.
*H01R 24/00* (2011.01)
*G06F 1/16* (2006.01)
*G06F 1/18* (2006.01)
*G06K 7/00* (2006.01)

(52) U.S. Cl.
CPC ............ *G06F 1/1656* (2013.01); *G06K 7/0013* (2013.01); *G06F 1/181* (2013.01)

(58) Field of Classification Search
CPC ............................ H01R 27/00; H01R 23/7068
USPC ............................... 439/630, 188, 541, 5, 631
See application file for complete search history.

(56) References Cited

U.S. PATENT DOCUMENTS

| | | | |
|---|---|---|---|
| 6,623,304 | B2 | 9/2003 | Harasawa et al. |
| 7,448,889 | B1* | 11/2008 | Ho et al. .......................... 439/159 |
| 7,766,676 | B2* | 8/2010 | Hsieh et al. .................... 439/136 |
| 7,980,876 | B2 | 7/2011 | Bombale et al. |
| 2007/0111554 | A1* | 5/2007 | Nishizaw et al. ............... 439/60 |
| 2008/0020800 | A1* | 1/2008 | Xu .................................. 455/558 |
| 2011/0255252 | A1* | 10/2011 | Sloey et al. .................... 361/752 |

FOREIGN PATENT DOCUMENTS

| | | |
|---|---|---|
| CN | 101587973 | 11/2009 |
| JP | 2007122354 | 5/2007 |

* cited by examiner

*Primary Examiner* — Phuongchi T Nguyen
(74) *Attorney, Agent, or Firm* — Brooks, Cameron & Huebsch, PLLC

(57) ABSTRACT

An opening in a housing of a computing device. A port, including an electrical contact to electrically connect to a connector, can be in the opening. The electrical contract to receive power through the port. A memory card can also be inserted through the opening.

9 Claims, 5 Drawing Sheets

RECESS FOR MEMORY CARD

BACKGROUND

A computing device may include many openings. For example an opening may be for a memory card slot, a data port such as universal serial bus, a power port to receive power or another type of port.

BRIEF DESCRIPTION OF THE DRAWINGS

Some embodiments of the invention are described with respect to the following figures.

DETAILED DESCRIPTION

Figure 1:
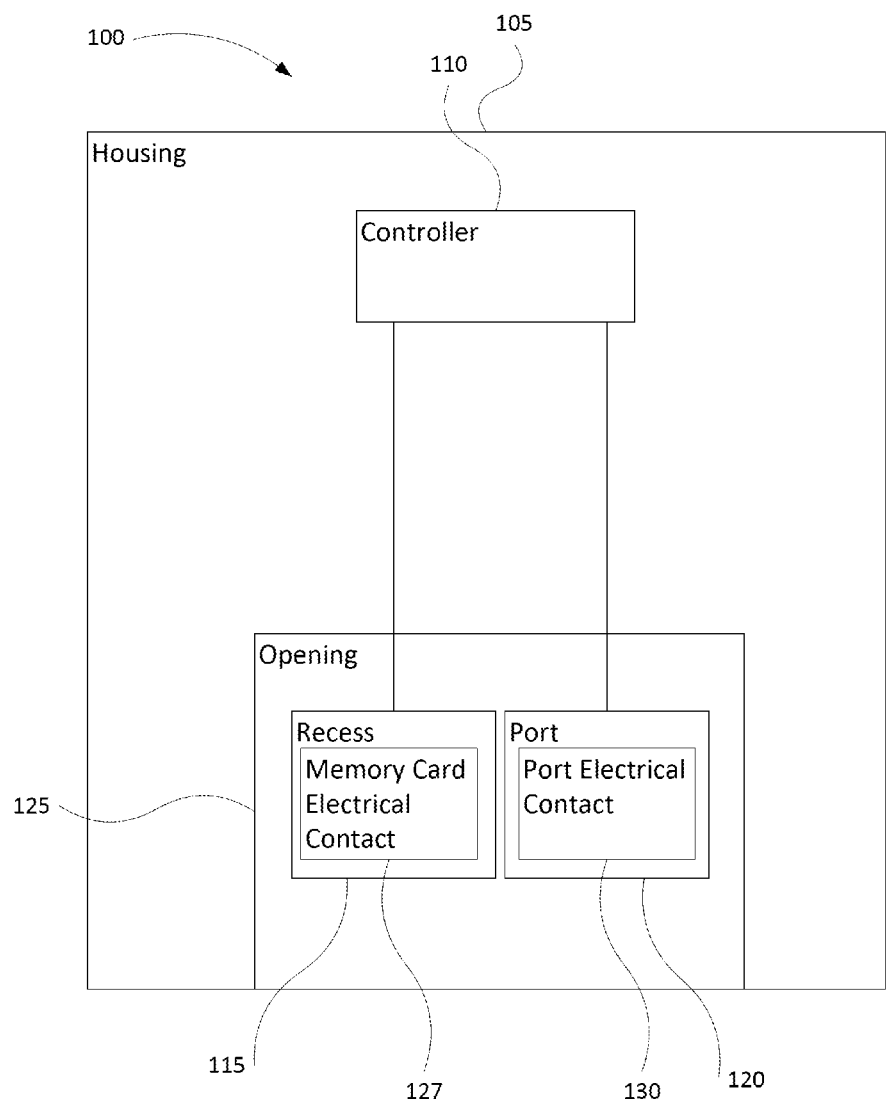
FIG. 1 is a block diagram of a computing device including a recess for a memory card according to an example implementation.

A computing device may include openings for connecting peripherals to the computing system. Some openings are not often used as they are for peripherals that remain attached to the computing device or they are for peripherals that are rarely connected to a computing device. An opening in a housing may for example disrupt an industrial design for the housing or may allow contaminants such as dust or water to enter the housing, therefore example implementations are directed toward reducing the number of openings in the housing of a computing device. A computing system may include various form factors such as a notebook computer, tablet computer, cellular phone or another form factor. A user may want to attach a peripheral to the computing system and leave it attached. One example of a peripheral that may be left attached to a computing system is a memory card. An example of a memory card may be a subscriber identity module (SIM) card. A SIM card is an integrated circuit that securely stores the International Mobile Subscriber Identity (IMSI) and the related key used to identify and authenticate subscribers on mobile telephony devices. The SIM card can be used in conjunction with a wireless wide area network module in a computing system to provide a network connection to a wireless network such as a cellular data network. The cellular data network may connect the computing device to the internet. SIM cards can store network-specific information used to authenticate and identify subscribers on the network. Some examples of network-specific information are the integrated circuit card identifier (ICCID), International Mobile Subscriber Identity (IMSI), Authentication Key (Ki), Local Area Identity (LAI) and Operator-Specific Emergency Number. SIM cards may be different sizes, such as full-size, mini-SIM, micro-SIM and embedded SIM, which may be specified by a standards setting body.

The SIM card is one example of a memory card that may be connected to the computing device and remain physically connected throughout the life of the computing device. The SIM card may be installed by the manufacturer or the SIM card may be provided by a service provider and installed in the system. Some SIM cards may not be compatible with a service provider's system and have to be exchanged for a SIM card for a new service provider if a user switches to a new service provider. Since the SIM card may be provided by a service provider the manufacturer of the computing system may make the SIM card accessible to the user.

The SIM card is one example of a memory card that is not removed often. Therefore a SIM card may be installed through an opening in the computing system that is shared with port to receive a connector. In one implementation, a computing device includes an opening in a housing of the computing device. A port is in the opening and can include electrical contacts to electrically connect to a connector. The electrical contracts can receive power through the port. A recess can be accessible through the opening to receive a memory card. The memory card recess is accessible if a connector is not coupled to the port and is not accessible if the connector is coupled to the port.

In another implementation, a computing device includes an opening in a housing of the computing device. A first electrical contact can be accessible through the opening to connect to a connector. The first electrical contact can receive power. A second electrical contact can be accessible through the opening to connect to a memory card. The electrical contacts may be made of copper, gold, silver or another material that can conduct electrical signals.

FIG. 1 is a block diagram of a computing device including a recess for a memory card according to an example implementation. The computing device 100 can include an opening 125 in a housing 105 of the computing device. The computing device 100 can include a port 120 in the opening 125. The port 120 can include port electrical contacts 130. The port electrical contacts 130 may electrically connect to a connector. The connector may provide power, data or both to the computing device. For example the connector may be a universal serial bus (USB) connector and the port may be a USB port. Other connectors and ports may also be used such as Institute of Electrical and Electronics Engineers (IEEE) 1394, external Serial Advanced Technology Attachment (eSata), High-Definition Multimedia Interface (HDMI), a proprietary connector and port or another standard connector and port. In one example a connector may include multiple electrical contacts such as those in table 1. The electrical contacts may be referred to as pins.

TABLE 1

| Pin | Signal | Description |
| --- | --- | --- |
| 1 | GND | Ground (−) |
| 2 | GND | Audio & Video ground (−) |
| 3 | Right | Line Out - R (+) |
|   |   | (Audio output, right channel) |
| 4 | Left | Line Out - L(+) |
|   |   | (Audio output, left channel) |
| 5 | Right In | Line In - R (+) |
| 6 | Left In | Line In - L (+) |
| 7 | RSVD | Reserved |
| 8 | Video Out | Composite video output |
| 9 | S-Video Chrominance output | S-Video Chrominance output |
| 10 | S-Video Luminance output | S-Video Luminance output |
| 11 | AUDIO_SW |   |
| 12 | Tx | Serial TxD |
| 13 | Rx | Serial RxD |
| 14 | RSVD | Reserved |
| 15 | GND | Ground (−) |
| 16 | GND | USB GND (−) |
| 17 | RSVD | Reserved |
| 18 | 3.3 V | 3.3 V Power (+) |
| 19, 20 | +12 V | Firewire Power 12 VDC (+) |
| 21 | Accessory Indicator/ | Different resistances |

TABLE 1-continued

| Pin | Signal | Description |
|---|---|---|
| | Serial enable | indicate accessory type |
| 22 | TPA (−) | FireWire Data TPA (−) |
| 23 | 5 VDC (+) | USB Power 5 VDC (+) |
| 24 | TPA (+) | FireWire Data TPA (+) |
| 25 | Data (−) | USB Data (−) |
| 26 | TPB (−) | FireWire Data TPB (−) |
| 27 | Data (+) | USB Data (+) |
| 28 | TPB (+) | FireWire Data TPB (+) |
| 29, 30 | GND | FireWire Ground (−) |

The connector may supply power to be received through the port when the connector is connected to the port. See for example pin 18 and 15 in table 1. The power may be for example direct current (DC) power. The DC power received by the computing device through the port can be used to power the components of the computing device such as the display and processor or may be used to charge a battery or supply power to other components. The connector may also provide a data connection between the computing device and a peripheral for example pin 12 and 13 may be for transmitting and receiving serial data respectively. A controller 110 such as a processor may be connected to the port. The controller may process instruction and data received through the port 120. The controller may also be powered by the power received by the port 120.

A memory card recess 115 is accessible through the opening 125 in the housing 105 to receive a memory card. The memory card recess 115 may be accessible if the connector is not connected to the port 120 and the memory card recess 115 may not be accessible if the connector is connected to the port 120. The memory card recess 115 may be of a size to accept the memory card and the memory card is inserted in the memory card recess 115. The memory card recess 115 may also be larger than the memory card and a tray is used to hold the memory card so that the memory card recess 115 can be a size to accept the memory card and a tray. The memory card may be connected to the controller 110. The controller 110 can write data to the memory card and read data from the memory card.

The memory card recess 115 can include a memory card electrical contact 125. The memory card electrical contact 127 can supply power to the memory card to allow and send data to the memory card and read data from the memory card. The memory card may be a SIM card, a secure digital (SD) card, a Multimedia Card, a smart card, or another type of memory card. The memory card electrical contacts 127 can be arranged according to a standard for the memory card they are designed to communicate with. If the memory card electrical contact 127 is for a SIM card the SIM card may have 6 or 8 contacts. The contacts for a SIM card may include those listed in table 2.

TABLE 2

| Pin | Name | Description |
|---|---|---|
| 1 | VCC | +5 VDC power supply input (optional use by the card) |
| 2 | RESET | Either used itself (reset signal supplied from the interface device) or in combination with an interal reset control circuit (optional use by the card). If internal reset is implemented, the voltage supply on Vcc is mandatory |
| 3 | CLOCK | Clocking or timing signal (optional use by the card) |
| 4 | GND | Ground (reference voltage) |
| 5 | Vpp | Programing voltage input (optional). This contact may be used to supply the voltage required to program or to |

TABLE 2-continued

| Pin | Name | Description |
|---|---|---|
| | | erase the internal non-volatile memory. |
| 6 | I/O | Input or Output for serial data to the integrated circuit inside the card |
| 7 | I/O or N/C | Input or Output for data or not connected |
| 8 | AS or N/C | Application specific or not connected |

The electrical contact 130 for the port 120 can be independent of the electrical contacts 127 for the memory card 115. For example the port may have power contacts and the memory card may have separate power contacts. The port may have data contacts and the memory card may have separate memory contacts. In one implementation the memory card and the port may share electrical contacts such as power or data contacts.

In an alternative implementation, a computing device 100 can include an opening 125 in a housing 105 of the computing device 100. A first set of electrical contacts can be accessible through the opening to connect to a connector. The first set of electrical contacts can be the port electrical contacts 130. The first set of electrical contacts can receive power. For example the connector can connect to the electrical contact and the first set of electrical contacts can receive power supplied by the connector. The port electrical contact 130 may establish a serial data connection to a peripheral device connected to the connector.

A second set of electrical contacts can be accessible through the opening to connect to a memory card for example the memory card electrical contact 127. A tray may be used to align a memory card with the second set of contacts. The tray may include the port 120 and the first set of contacts.

Figure 2A:
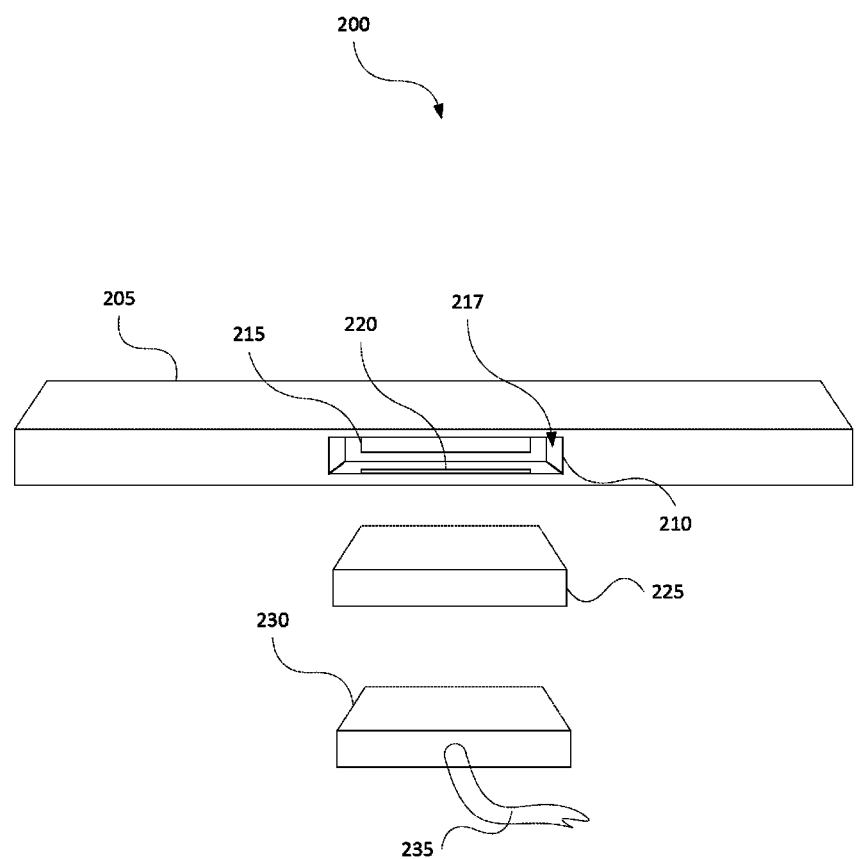
FIG. 2a is a computing device including a recess for a memory card according to an example implementation.

FIG. 2a is a computing device 200 including a memory card recess 215 for a memory card 225 according to an example implementation. The computing device 200 can include a housing 205.

The memory card recess 215 may include an area for a memory card and for a connector. For example the memory card recess 215 may receive the memory card 225. The memory card recess 215 can be accessible through the opening 210. The opening 210 can include electrical connects 220 within the connector recess 217. If the memory card 225 is inserted in the memory card recess 215 connector 230 can make a connection to the electrical contacts 220. A wire 235 can be connected to the connector 230 to supply power from a power supply. The Power supply may include an alternating current to direct current converter (AC to DC converter). The power can be used to charge a battery of the computing device or may be used to power the components of the computing device such as a display or a controller. In one implementation there may be multiple recesses for memory cards, such that the computing device can receive more than one memory card through the opening 210.

Figure 2B:
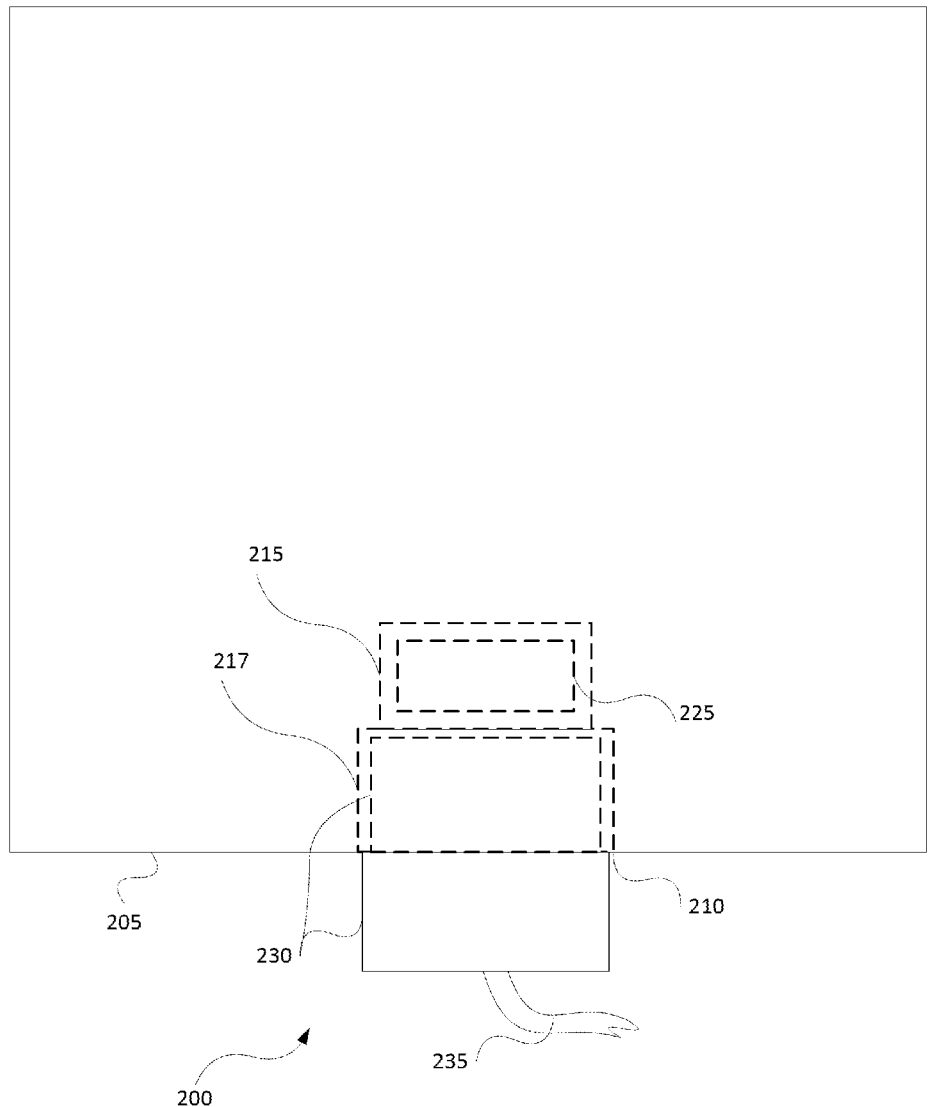
FIG. 2b is a computing device including a recess for a memory card according to an example implementation.

FIG. 2b is another view of the computing device of FIG. 2A including a memory card recess 215 for a memory card according to an example implementation. The computing device 200 can include a housing 205. The dotted lines represent components that are internal to the housing. The memory card recess 215 can include the memory card 225. The connector recess 217 can receive the connector 230 through the opening 210. The connector 230 can be connected to a wire 235.

Figure 3:
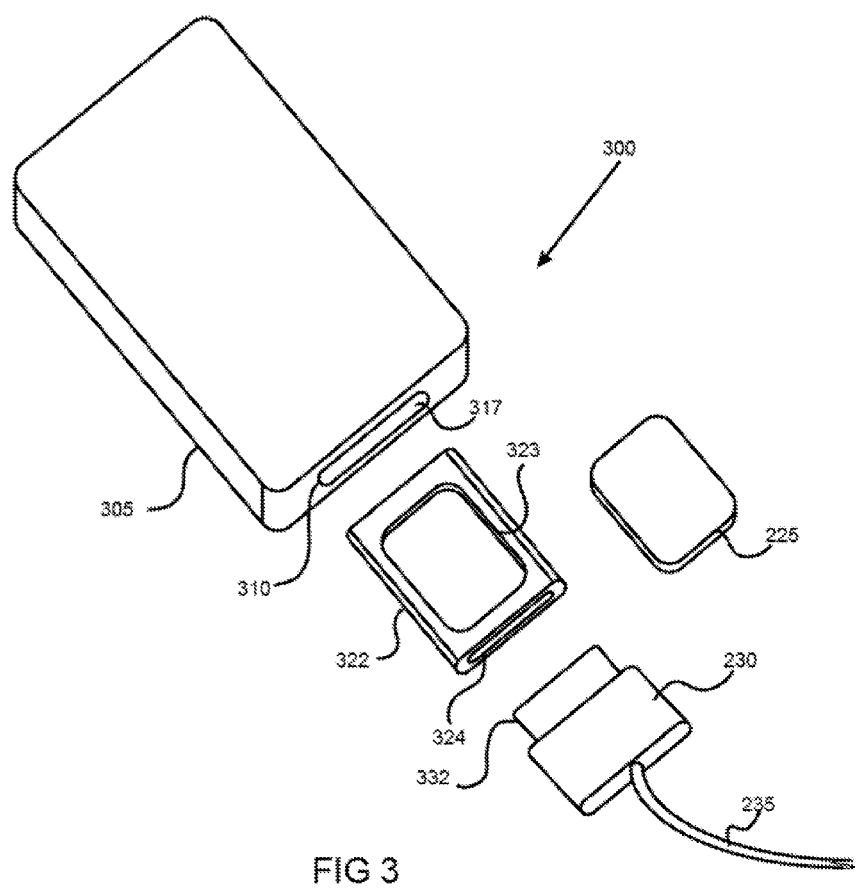
FIG. 3 is a computing device including a recess for a memory card according to an example implementation.

FIG. 3 is a computing device including a tray recess 317 for a memory card according to an example implementation. The computing device 300 can include an opening 310 in a housing 305. Within the opening may be electrical contacts for electrically connecting to a memory card 225 and a connector 230.

A tray 322 can be inserted into the tray recess 317 through opening 310. The tray 322 can support the memory card 225 within memory card recess 323. The tray 322 may be exchanged with a tray for a different type or size of memory card. For example if the computing device came with memory card recess 323 that supported a mini SIM card and a wireless service provider supplied a micro SIM card to use in the computing device a tray 322 that supports the mini SIM can be removed and a tray that supports the Micro SIM can be inserted. The memory card recess 323 may have electrical contacts that connect to electrical contacts on the memory card 225 or the tray may not have contacts for the memory card 225 but may align the memory card contacts with contacts within the tray recess 317. A tray may include multiple recesses 323 for memory cards, so that multiple memory cards can be received by the computing device through the opening 310.

The tray 322 may include port 324. The tray 322 may include electrical contacts in the port that are connected to electrical contacts in the tray recess 317 if the tray 322 is inserted in the tray recess 317. The contact portion 332 of the connector 230 is connected to the port 324 the electrical connection can be made between the connector 332 and the computing device 300. The connector 230 can have a wire 235 extending from the connector to provide power to the connector 230 and through the port 324 to the computing device 300.

Alternatively, the tray may have a port 324 without electrical contacts in the tray. If the tray is inserted in the tray recess 317 of the housing 305 the port 324 in the tray 322 aligns the electrical contacts in the contact portion 332 of the connector 230 with electrical contacts in the tray recess 317 of the computing device 300.

Figure 4:
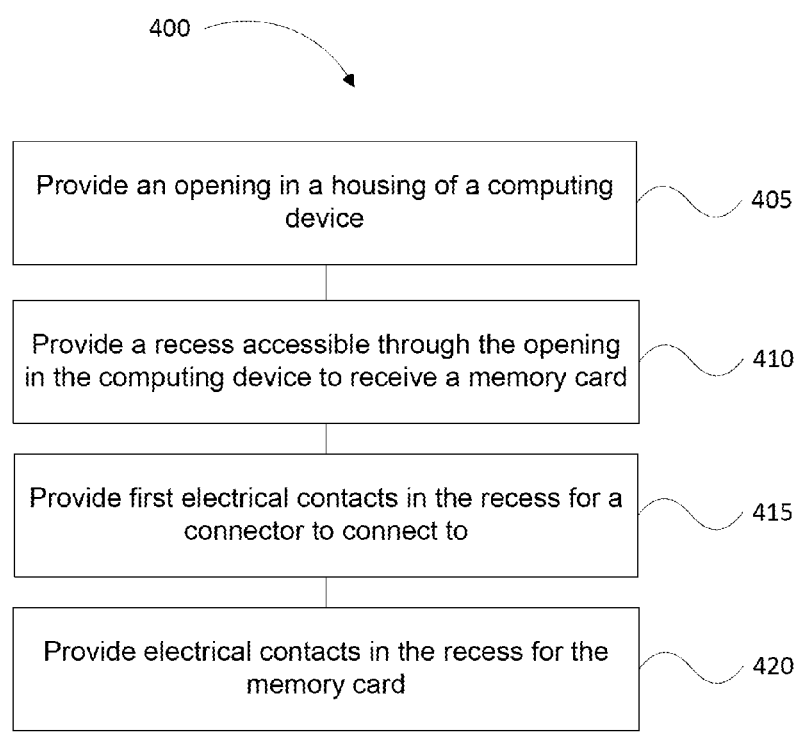
FIG. 4 is a flow diagram of a method of providing access to a memory card in a computing device.

FIG. 4 is a flow diagram of a method of providing access to a memory card in a computing device. The method 400 includes providing an opening in a housing of a computing device at 405. If an opening is provided a recess accessible through the opening in the computing device to receive a memory card can be provided at 410. First electrical contacts can be provided in the recess for a connector to connect to at 415. Electrical contacts can be provided in the recess for the memory card at 420. The first electrical contacts for the connector can be used to power the device through a connector connected to the first electrical contacts.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   an opening in a housing of the computing device;
   a first recess, including a first electrical contact to electrically connect to a connector, in the opening;
   the first electrical contact to receive power;
   a second recess disposed inside the first recess and accessible through the opening to receive a memory card, wherein the second recess is accessible if the connector is not coupled to the first recess and is not accessible if the connector is coupled to the first recess;
   a tray positioned behind the first and second recess, the tray including:
      a port;
      a memory card recess positioned anterior to the port; and
      a third set of electrical contacts, the tray to:
         receive the memory card through the memory card recess such that the memory card is electrically coupled to the third set of electrical contacts;
         support the memory card; and
         insert into at least a portion of the second recess; and
   a wire connected to the connector to supply power from an alternating current to direct current power converter, wherein the port is electrically coupleable to at least a portion of the first electrical contact.

2. The device of claim 1, wherein the first electrical contact in the first recess is independent of a second electrical contact for the memory card.

3. The device of claim 1, wherein the memory card is a Subscriber identity module (SIM) card.

4. The device of claim 1, wherein the first electrical contact is to receive power from the connector.

5. A computing device comprising:
   an opening in a housing of the computing device;
   a first set of electrical contacts accessible through a recess provided in the opening to connect to a connector, wherein the electrical contacts can receive power;
   a second set of electrical contacts accessible through the recess provided in the opening to connect to a memory card; and
   a tray positioned behind the first and second recess, the tray including:
      a port;
      a memory card recess positioned anterior to the port; and
      a third set of electrical contacts, the tray to:
         receive the memory card through the memory card recess such that the memory card is electrically coupled to the third set of electrical contacts:
         support the memory card;
         insert into at least a portion of the recess; and
         align the memory card with the second set of electrical contacts; and
   a wire connected to the connector to supply power from an alternating current to direct current power converter, wherein the port is electrically coupleable to at least a portion of the first set of electrical contacts.

6. The device of claim 5, wherein the first set of electrical contacts and the second set of electrical contacts are independent.

7. The device of claim 5, wherein the first set of electrical contacts include contacts to establish a serial data connection to a peripheral device.

8. A method of providing a memory card and a port through an opening in a computing device comprising:
   providing an opening in a housing of a computing device;
   providing a recess accessible through the opening in the computing device to receive a memory card;
   providing a first set of electrical contacts in the recess for a connector to connect to;
   providing a second set of electrical contacts in the recess for the memory card;
   providing a tray positioned behind the first and second recess, the tray including:
      a port;
      a memory card recess positioned anterior to the port; and
      a third set of electrical contacts, the tray to:

receive the memory card through the memory card recess such that the memory card is electrically coupled to the third set of electrical contacts:
support the memory card;
insert into at least a portion of the recess; and
align the memory card with the second set of electrical contacts; and
a wire connected to the connector to supply power from an alternating current to direct current power converter, wherein the port is electrically coupleable to at least a portion of the first set of electrical contacts.

9. The method of claim 8 comprising:
powering the device through a connector connected to the first set of electrical contacts.

\* \* \* \* \*